March 22, 1960   G. T. HEMMETER   2,929,599
BALANCER MOUNT
Filed Feb. 21, 1958   2 Sheets-Sheet 1
FIG_1
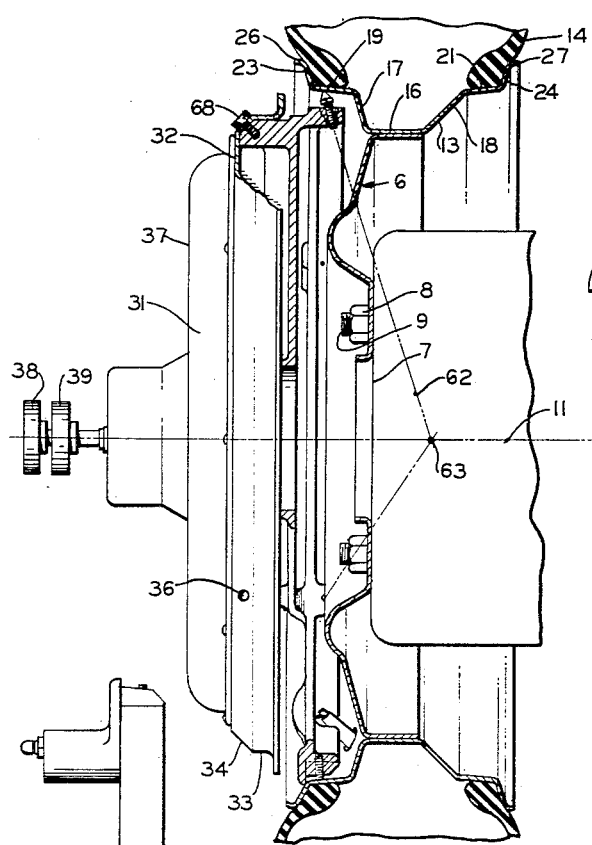
FIG_2
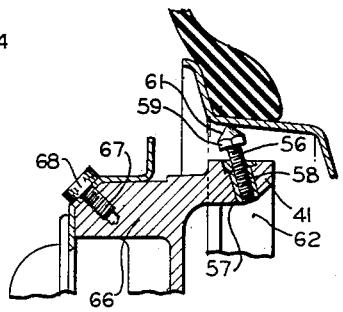
FIG_3
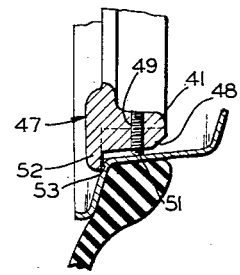
FIG_7   FIG_8   FIG_9
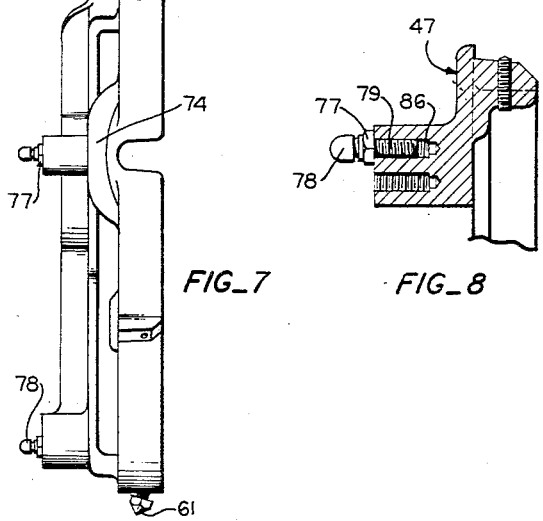
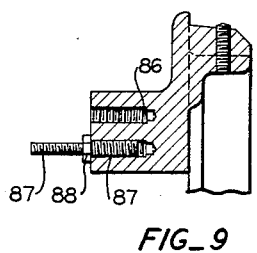
INVENTOR.
GEORGE T. HEMMETER
BY Lothrop & West
ATTORNEYS March 22, 1960 G. T. HEMMETER 2,929,599
BALANCER MOUNT
Filed Feb. 21, 1958 2 Sheets-Sheet 2
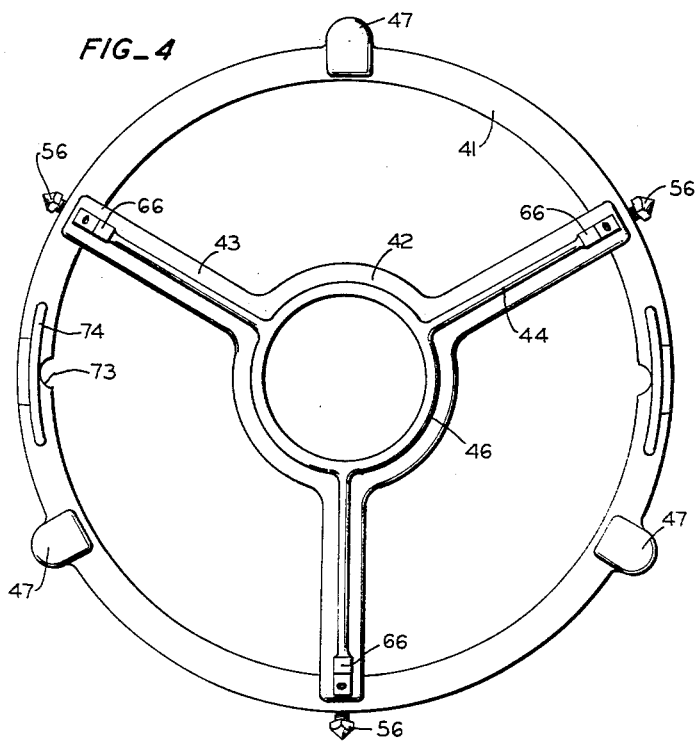
FIG_4
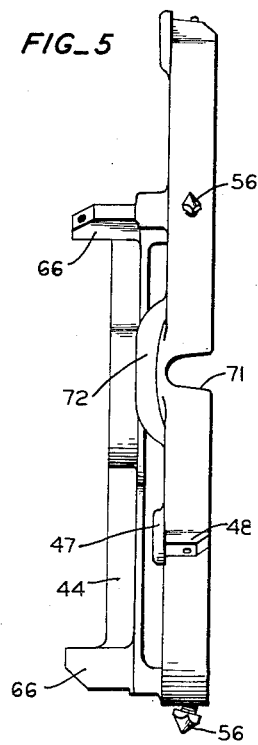
FIG_5
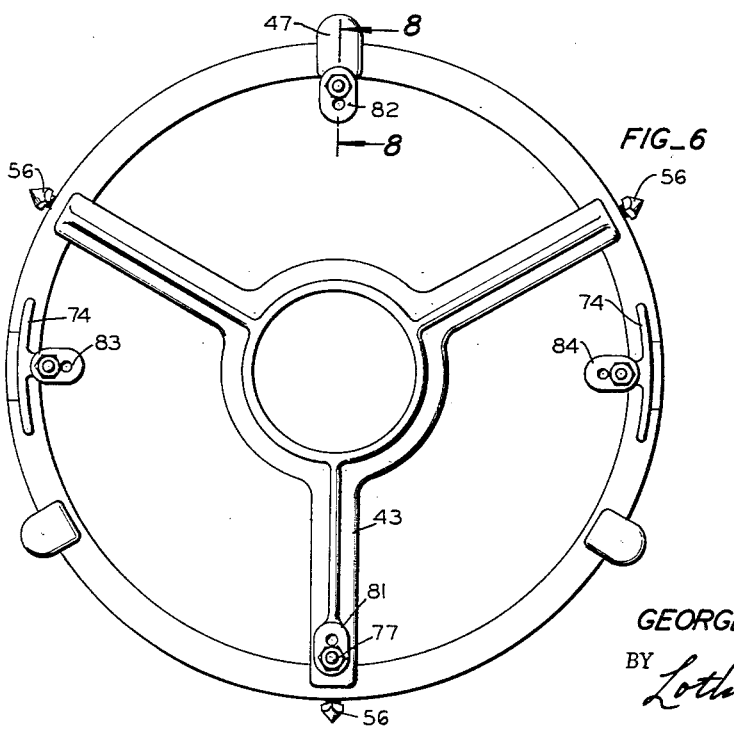
FIG_6
INVENTOR.
GEORGE T. HEMMETER
BY Lothrop & West
ATTORNEYS United States Patent Office 2,929,599
Patented Mar. 22, 1960

2,929,599

BALANCER MOUNT

George T. Hemmeter, Los Altos, Calif.

Application February 21, 1958, Serial No. 716,748

7 Claims. (Cl. 248—205)

The invention is especially concerned with mechanisms for temporarily securing a portable wheel balancing unit onto an automobile wheel for rotation therewith during a balancing operation. A balancing unit of the sort referred to and the general technique of automobile wheel balancing are referred to in my co-pending application Serial Number 700,778, filed December 5, 1957 and entitled "Wheel Balancer."

In the utilization of a wheel balancing unit it is necessary that the unit be temporarily attached to an automobile rim for rotation therewith at relatively high speeds, but for a short space of time, since the same balancing unit is used repeatedly on different wheels. It is essential that the wheel balancer be related to the wheel in such a way that "fly-off" cannot occur. This sometimes happens with the presently available mounts under severe conditions of vibration at high speed. It is a condition under which the balancer unit itself is thrown from the wheel. This results in damage to the balancer unit, but more important may cause injury to the operator.

It is therefore an object of my invention to provide a balancer mount which precludes the possibility of a "fly-off."

Another object of the invention is to provide a balancer mount which can easily be attached to a vehicle wheel rim.

Another object of the invention is to provide a balancer mount which is itself readily centered and does not disturb the condition of balance of a wheel.

Another object of the invention is to provide a balancer mount which can be utilized with any of several different forms of wheel balancing units now available.

Another object of the invention is to provide a balancer mount which will not substantially deform or distort in use either while on the wheel or while being handled or thrown around in the balancing shop.

Another object of the invention is to provide a balancer mount which can accurately be positioned and fastened by elementary mechanical means utilizing elementary tools.

Another object of the invention is to provide a balancer mount which can be made at a relatively low cost and can be expected to have a long life.

A still further object of the invention is in general to provide an improved balancer mount.

Other objects, together with the foregoing, are attained in the embodiments of the invention described in the accompanying description and illustrated in the accompanying drawings in which:

Figure 1 is a cross section on a vertical, axial plane through a balancer mount installed on a vehicle wheel and having a balancing unit mounted thereon;

Figure 2 is an enlarged detail with the same plane of section and showing part of the structure of Figure 1;

Figure 3 is another cross section comparable to Figure 1, but showing to an enlarged scale a detail of the construction;

Figure 4 is an end elevation of the structure of Figure 1;

Figure 5 is a side elevation of the structure of Figure 4;

Figure 6 is an end elevation of a modified form of structure comparable to that shown in Figure 4;

Figure 7 is a side elevation of the structure of Figure 6;

Figure 8 is a cross section, the plane of section being indicated by the line 8—8 of Figure 6;

Figure 9 is a view comparable to Figure 8 but showing a modified construction.

While the balancer mount pursuant to the invention can be constructed in a number of different ways particularly depending upon the precise environment in which it is to be utilized, it has successfully been incorporated in the several forms shown herein. The balancer mount is designed primarily for use in connection with an automobile wheel 6 secured to a rotatable mounting mechanism 7 by means of a number of removable nuts 8 screwed onto studs 9 in the customary way. The wheel 6 is thus readily rotatable about a rotational axis 11.

Included in the wheel 6 is a peripheral rim 13 on which the customary tire 14 is mounted. The rim 13 is provided with a dropped central portion 16 merging with flaring walls 17 and 18. Flat bead bands 19 and 21 join the walls 17 and 18 and themselves extend into rim walls 23 and 24 that flare outwardly and end in rolled edges 26 and 27. The bead bands 19 and 21 are substantially cylindrical surfaces being inclined outwardly at an angle of approximately 6° in most present wheel designs. They are disposed with respect to the mount 7 approximately as shown to scale in Figure 1. It is understood that the design of individual wheels and rims and mountings varies somewhat, but the showing is an average example.

As shown in Figure 1, a presently utilized form of wheel balancing unit 31 includes a base plate 32 having a peripheral flange 33 including a conical portion 34 in which there are provided apertures 36 for use in securing the balancing unit to a wheel to be balanced. On the base plate 32 is disposed a housing 37 incorporating the balancing mechanism (not shown) controlled by hand knobs 38 and 39 designed to be disposed on the axis 11.

In order properly to mount the balancing unit 31 on the wheel 6 I preferably provide, especially as shown in Figures 1 to 6, a balancer unit having an outer ring 41 and an inner ring 42 joined by radial arms 43. Preferably the rings and arms are integrally cast of aluminum or other light material and are provided with suitable reinforcing fins 44 and beads 46 so as to constitute a mechanically strong and substantially non-yieldable, symmetrical structure. The inner ring 42 accommodates the usual wheel hub protuberance (not shown) and serves as a visual gauge of concentricity. The diameter of the outer ring 41 is such that the periphery of the ring fits easily with substantial clearance within the confines of the bead band 19 on the outside face of the wheel 6. The side of the wheel on which the nuts 8 are disposed is considered as the outside face.

In order appropriately to position the outer ring 41 with respect to the wheel 6, the ring has cast integrally at appropriate intervals a number of outstanding lugs 47 symmetrically disposed intermediate the radial arms 43. The lugs are especially illustrated in Figure 3 and are arranged so that each of them has a radially extending portion 48. The outer radius of the lug 47 is greater than that of the outer ring and approaches very closely to the inside radius of the bead band 19 of the wheel.

While the portion 48 of the lug could be made directly to abut the bead band 19, it is preferred to provide a hardened screw 49 threaded into the outer ring 41 and the lug 47 from the inside thereof so that there is an extending portion 41 at the outer end of the screw 49. Since this screw is a very tight fit, it can initially be adjusted and will hold its adjustment. The foot or end projection 51 of the screw not only provides a hard wearing surface for repeated contact with successive rims, but also provides an adjustable contact so that the radius measured at the end 51 of the screw will be exact.

Since there are three such screws 49, the radial positioning of the outer ring 41 against the bead band 19 is accomplished with great accuracy on all wheels of the same nominal size. Furthermore, this adjustment can be varied slightly from time to time if necessary to compensate for wear. The balancer mount as a whole is in this way quite accurately centered so that it is concentric with the axis 11 and does not produce extraneous unbalance of the wheel.

The lug 47 is contoured to provide radial extensions 52 which are machined to desired abutting surfaces 53 all in a plane perpendicular to the rotational axis 11. Upon installation of the balancer mount, the abutting surface 53 of each of the lugs 47 is pressed axially into close abutment with the outer flange 23 of the wheel 6. Not only is the balancer mount accurately centered by the lugs 47, but because of the lugs 47 it is also disposed with its plane perpendicular to the axis 11. The positioning of the balancer mount is therefore as accurate as can be accomplished with any given rim.

In order that the balancer mount, when once accurately positioned, can be firmly held during operation, fastening devices 56 are provided in the outer ring 41. These are disposed at convenient symmetrical locations, preferably with each one in exact alignment with one of the radial arms 43. The outer ring 41 at a location in line with an adjacent radial arm 43 receives a flanged steel insert 57. This is conveniently externally knurled so that it is in effect embedded in the material of the balancer mount.

Screwed into the flanged insert 57 is the body 58 of the hardened fastening screw 56 which includes an enlarged, non-circular head 59 positioned for the ready reception of an end wrench or other elementary tool so that the screw 56 can be rotated. The screw also includes a hardened, conical point 61 usually maintained in relatively sharp condition so that the screw point can be actually embedded a slight extent in the metal of the bead band 19.

The screw 56 when rotated is turned about and is moved bodily along a rotational axis 62. This is disposed so that the axis 62 preferably is not normal or perpendicular to the rotational axis 11, but rather is inclined or tipped with the outermost portion of the axis extending toward the outer face of the wheel 6. It can be considered that the several axes 62 of the several fastening screws 56 all converge toward and intersect at a point 63 lying on the rotational axis 11 and that these axes 62 are elements of a cone concentric with the axis 11 so that the point 63 is in fact the apex of the cone. Since this apex is disposed away from the outer face of the wheel 6, the screws 56 when rotated by engagement of a tool with the head portion 59 and moving along their axes 62 in a radially outward direction also have a component of motion which is outward with respect to the rotational axis 11. The points 61 are thus angularly embedded in the material of the bead band 19 by suitable rotation of the fastening screws. Also, the extensions 52 of the lugs 47 are forced inwardly to seat tightly against the rim wall 23.

With this arrangement, even at high speed rotation and under the influence of disturbing forces it is impossible for the balancer mount to move axially or to fly off of the wheel. Any such movement would necessitate the substantial displacement or disruption of the material of the bead band 19 or would require a sort of toggle rotational overturning of the fastening screws 56. This is distinguished from a case in which the fastening screws are merely put in with their rotational axes lying in a plane normal to the rotational axis 11. In that case, any movement outwardly of the wheel or outwardly along the rotational axis 11 lessens the effective radius of the points 61 and so increases the chance of dislodgment and fly-off. Any displacement of a screw having its own rotational axis originally in a plane containing the rotational axis 11 and originally with its own axis perpendicular to the rotational axis makes the screw shorter in effective radius and permits easy dislodgment. In contrast, any attempted axially outward displacement of the present balancer mount causes the points 61 to "dig in" farther and to make the fastening more secure. The centrifugal force effective upon the mount has a similar effect; i.e., tends to make the points dig in farther. The fastening of the mount to the rim, although easily effected with normal tools entering between the outer ring 41 and the bead band 19, is substantial, firm and entirely safe. By use of a suitable tool on the heads 59, the screws 56 can subsequently be radially retracted and the device very simply unmounted.

One of the main reasons for putting the mounting screw 56 in line with the arms 43 and for the presence of the arms 43 and the inner ring 42 is so that the radial force exerted on the outer ring 41 when the screws 56 are severely tightened will not produce any appreciable circumferential, radially inward deflection or deformation of the ring. The radial force imposed by tightening of the screws 56 is immediately resisted by the adjacent radial arms 43 and the inner ring 42. The structure is carefully arranged so that the disruptive forces due to rotation or due to mishandling of the unit in the shop will not in any serious way interfere with the safe operation of the fastening screws 56.

The means for receiving the balancing unit in this instance preferably includes a plurality of lugs 66 upstanding from each of the radial arms 43 and in effect also from the adjacent portions of the outer ring 41. Each of the lugs 66 has an axial extent sufficient so that it can readily accommodate the rim 32 of a balancing unit 31 when the rim 32 is telescoped thereover. Each lug 66 is provided with a tapped hole 67 to receive a thumb bolt 68 passing through the adjacent aperture 36 already provided on the balancing unit 31. In practice, the fastener 68 is usually left permanently or semi-permanently in place and the entire attachment of the balancing unit to the wheel is accomplished merely by rotation of the screws 56.

The outer ring 41 is also provided with an indentation 71 (Figure 5) so as to accommodate the usual inflation stem, the indentation 71 being surrounded by an adequate reinforcing flange 72. For symmetry, to assist in the ease of mounting and in order to prevent unbalance, the opposite side of the outer ring 41 is also provided with an indentation 73 and a corresponding reinforcing flange 74.

As especially shown in Figures 6 to 9, a modification is provided when the balancing unit has four rather than three fastening devices. In this instance, one of the fastening devices 77, for example, having a ball end 78, (Figures 6, 7 and 8) is screwed into a suitably tapped hole 79 in a lug 81 upstanding from one of the arms 43 whereas an opposite lug 82 is provided near the lug 47. Symmetrically disposed intermediate the lugs 81 and 82 are additional lugs 83 and 84 adjacent the reinforcement flanges 74. Each of the lugs 82, 83, and 84 is also provided with a ball fastener 77 to receive the balancing unit.

For another form of balancing unit also having four points of attachment but not using the ball end screws 78 and having its attachment points at a different diameter, the lugs 81, 82, 83 and 84 are also provided with additional tapped holes 86. These are for the reception of screws 87 having integral heads 88 so that they can be screwed into position in the inner holes 86. The screws are also provided with threaded extensions 88 to receive the securing nuts (not shown) provided with the balancing unit. The arangement of the lugs 81, 82, 83, and 84 is such that by alternately using the screws 77 or 87 different sorts of balancing units can readily be accommodated. The screws 77 and 87 are differently threaded to prevent improper installation.

It is generally the case that for balancing most wheels the balancing unit can semi-permanently be secured to one of the balancer mounts described herein. Occasionally it is necessary to move the balancing unit to a similar balancer mount of a different diameter or perhaps of a different contour to accommodate special wheels. Most of the time, however, the balancing unit can be left attached to the balancer mount. Attachment to the wheel rim is simply by manipulation of the screws 56. Following the balancing operation attachment is by a simple, reverse manipulation of the screws 56. The balancer mount is accurately positioned by a simple motion. It is easily and safely tightened by the operator. Rotation or vibratory motion of the wheel being balanced does not produce looseness but rather even further tightening. A simple, safe balancer mount is thus provided.

What is claimed is:

1. A balancer mount for use on a wheel rim comprising a ring rotatable with said rim about a rotational axis, peripheral lugs on said ring adapted to abut said rim upon movement of said ring toward said rim in an axial direction, centering screws threaded into said ring adjacent said lugs and extending radially from said ring to abut said rim radially, and securing screws threaded into said ring and projecting from the periphery thereof for movement relative to said ring, each of said securing screws being movable along an individual one of a plurality of inclined axes, said axes when considered together defining a cone having its apex on said rotational axis of said ring and on the side of said ring next to said rim.

2. A balancer mount for use on a wheel rim comprising a ring rotatable with said rim about a rotational axis, lugs on said ring adapted to abut said rim axially, securing screws, and means for mounting said securing screws in said ring to project outwardly of the periphery of said ring and for movement relative to said ring along axes defining a cone having its apex on said rotational axis of said ring and on the side of said ring next to said rim.

3. A balancer mount for use on a wheel rim having a bead band and a wall comprising a ring rotatable with said rim about a rotational axis and having a periphery adapted to be received within the confines of said bead band, means on said ring for abutting the outside face of said rim wall, a securing screw, and means including threads in said ring for mounting said securing screw in said ring at an inclination and for movement in the direction of said inclination simultaneously radially outward of said ring and toward said outside face of said rim wall.

4. A balancer mount comprising an outer ring, an inner ring, radial arms joining said rings, rim engaging securing screws, and means including threads in said outer ring for mounting said screws in said outer ring in substantial alignment with said radial arms, said securing screws having integral operating heads extending radially outside of said outer ring.

5. A balancer mount comprising an outer ring, an inner ring, radial arms disposed substantially in a plane and joining said rings, rim engaging securing screws, means including threads in said outer ring for mounting said screws in and to project outside of said outer ring at an inclination to the plane of said radial arms, and means connected to said outer ring for receiving a wheel balancer.

6. A balancer mount comprising a ring having an outside face, rim engaging securing screws threaded into said ring for movement in a direction with simultaneous components axially toward said outside face of said ring and radially outward of said ring, and means connected to said outside face of said ring for receiving a wheel balancer.

7. A balancer mount for use on a wheel rim adapted to rotate about an axis, said rim having a bead band and an adjacent rim wall comprising a ring having a periphery adapted to be disposed within the confines of said bead band, lugs on said ring and projecting radially outward therefrom in position for axial abutment with said rim wall, securing screws having pointed operating heads, and means including threads in said outer ring for mounting said securing screws in said ring with said operating heads radially outward of said ring and with the axes of said screws inclined so that as said screws are moved outwardly said heads also move in an axial direction toward said lugs.

References Cited in the file of this patent

FOREIGN PATENTS 746,520    Great Britain _____ Mar. 14, 1956